(12) United States Patent
Lee et al.

(10) Patent No.: US 7,077,578 B2
(45) Date of Patent: Jul. 18, 2006

(54) HOT PLUGGING DEVICE FOR OPTICAL TRANSCEIVER MODULES

(75) Inventors: Yeon-Jun Lee, Suwon-shi (KR); Dae-Jin Kim, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 209 days.

(21) Appl. No.: 10/728,013

(22) Filed: Dec. 4, 2003

(65) Prior Publication Data

US 2005/0018976 A1   Jan. 27, 2005

(30) Foreign Application Priority Data

Jul. 23, 2003   (KR) ..................... 10-2003-0050526

(51) Int. Cl.
*G02B 6/36* (2006.01)

(52) U.S. Cl. .......................................... 385/88; 385/89

(58) Field of Classification Search .................... None
See application file for complete search history.

(56) References Cited

U.S. PATENT DOCUMENTS 6,692,159 B1 *  2/2004  Chiu et al. ..................... 385/53
6,746,158 B1 *  6/2004  Merrick ........................ 385/53
6,789,958 B1 *  9/2004  Ahrens et al. ................. 385/92
6,851,867 B1 *  2/2005  Pang et al. .................... 385/88

* cited by examiner

*Primary Examiner*—Juliana Kang
(74) *Attorney, Agent, or Firm*—Cha & Reiter, L.L.C.

(57) ABSTRACT

Disclosed herein is a hot plugging device for optical transceiver modules. The hot plugging device comprises a module housing, latching grooves extended from prescribed positions of both sides of the module housing to one end of the module housing, respectively, sliding members extended in the longitudinal direction of the module housing and linearly movably accommodated in the latching grooves, respectively, and a rotating member rotatably attached to one end of the module housing for engaging ends of the sliding members with corresponding ends of the latching grooves, respectively, while the rotating member is placed at a prescribed angle to the longitudinal direction of the module housing. With the hot plugging device of the present invention, a locking unit of the module housing is easily released, and the release of the locking unit is maintained, whereby the module housing is easily separated from a cage. Also, a working space necessary to separate the module housing from the cage is reduced, whereby many more optical transceiver modules can be mounted. Furthermore, only latching pieces are deformed when the module housing is separated from the cage. Consequently, the present invention has an effect of preventing permanent deformation of the module housing or the cage or damage to the module housing or the cage.

16 Claims, 6 Drawing Sheets

HOT PLUGGING DEVICE FOR OPTICAL TRANSCEIVER MODULES

CLAIM OF PRIORITY

This application claims priority to an application entitled "HOT PLUGGING DEVICE FOR OPTICAL TRANSCEIVER MODULES," filed in the Korean Intellectual Property Office on Jul. 23, 2003 and assigned Serial No. 2003-50526, the contents of which ate hereby incorporated by reference.

BACKGROUND OF THE INVENTION

1. Field of the Invention

The present invention relates to a transceiver module for optical communication, and more particularly to a hot plugging device for optical transceiver modules.

2. Description of the Related Art

Hot plugging devices are used for extension and maintenance of communication networks in optical transmitting/receiving systems. The hot plugging device is used to replace elements mounted on the optical transmitting/receiving system, such as optical transceiver modules, or extend the communication network without stopping the system. Because of this, such hot plugging devices are useful where system maintenance work is frequently required.

Figure 1:
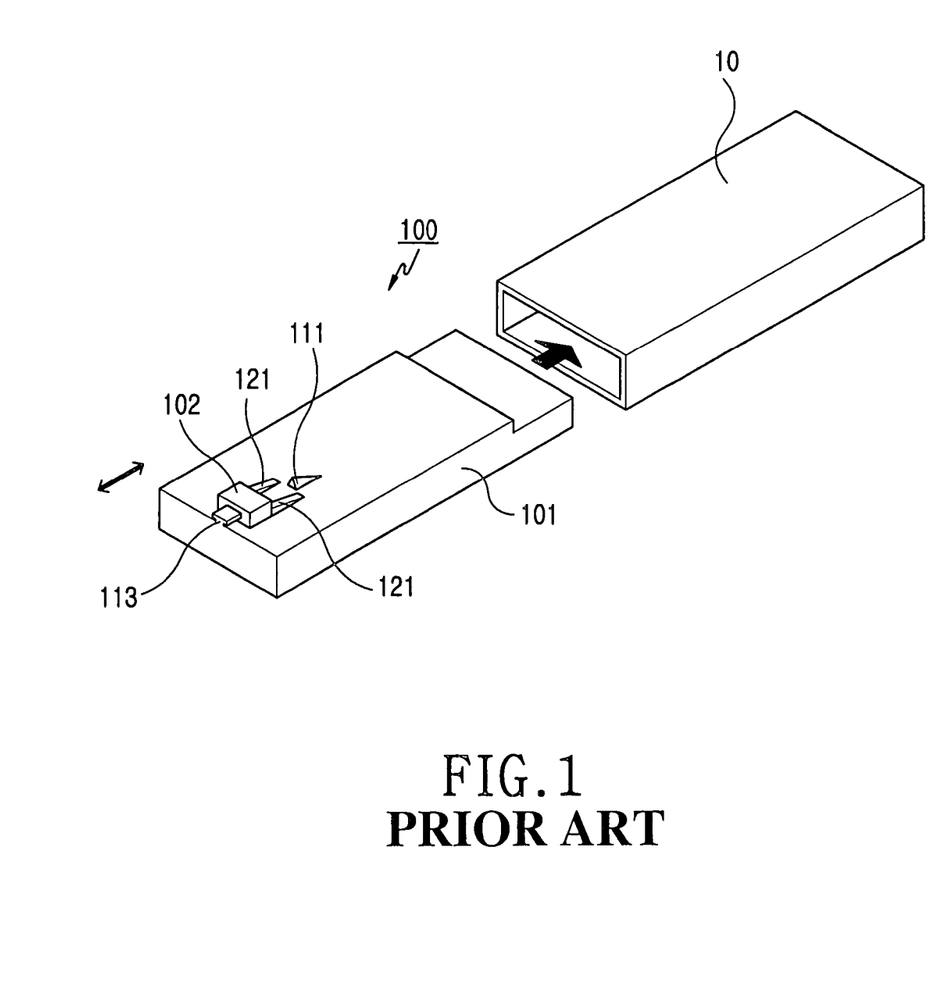
FIG. 1 is a perspective view showing a conventional hot plugging device for optical transceiver modules.
Figure 2:
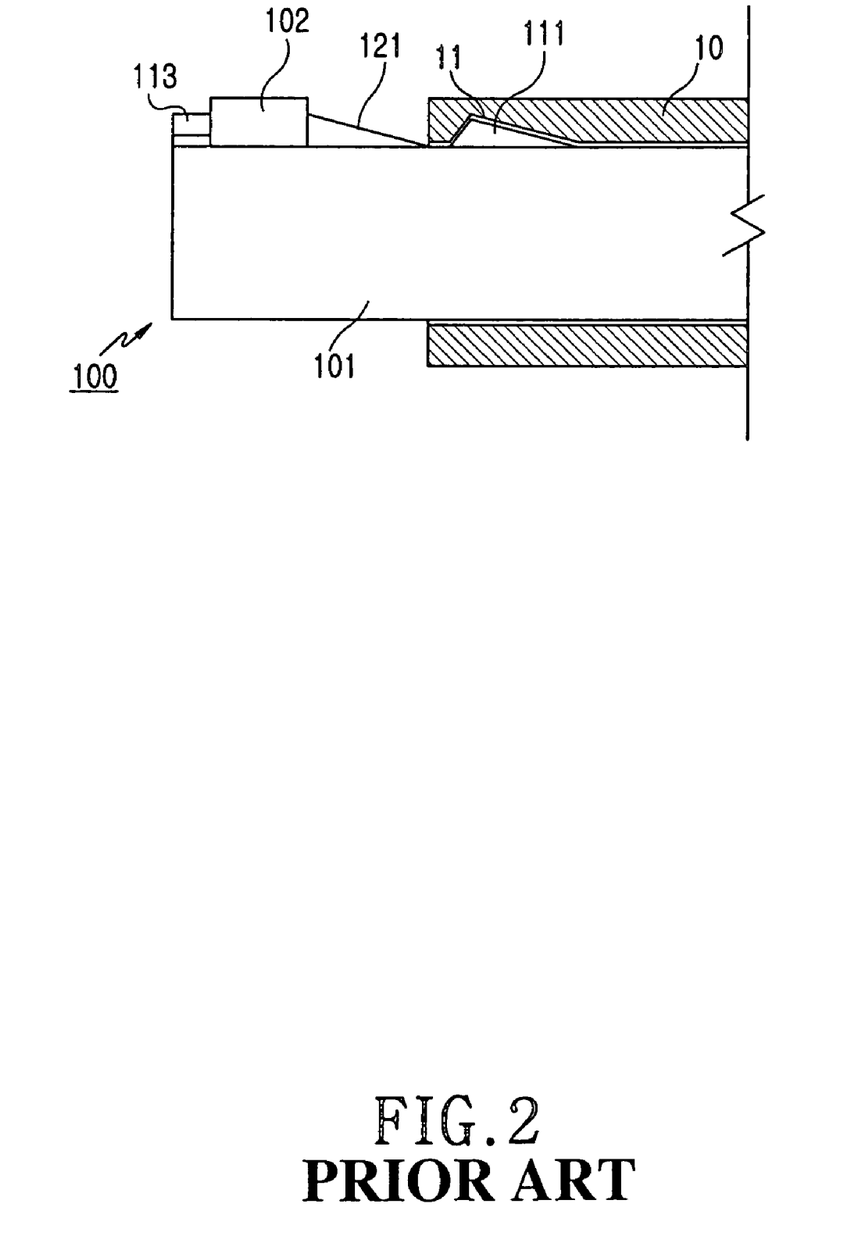
FIG. 2 is a side sectional view showing the hot plugging device of FIG. 1 engaged in a cage.

FIG. 1 is a perspective view showing a conventional hot plugging device for an optical transceiver module 100 according. FIG. 2 is a side sectional view showing the hot plugging device of FIG. 1 engaged in a cage 10. As shown in FIGS. 1 and 2, the conventional hot plugging device has a locking unit and a releasing unit, which are formed on a module housing 101.

The locking unit includes a triangular protrusion 111 formed on the module housing 101 and a groove 11 (See FIG. 2) formed at the inner side of the cage 10. The groove 11 corresponds to the triangular protrusion 111. When the module housing 101 is inserted into the cage 10, the triangular protrusion 111 is engaged in the groove 11 to maintain secure coupling between the module housing 101 and the cage 10.

The triangular protrusion 111 must be disengaged from the groove 11 to replace the optical transceiver module 100. The hot plugging unit is provided with a slider 102 as the releasing unit for disengaging the triangular protrusion 111 from the groove 11. The slider 102 is horizontally movably disposed on the module housing 101. The slider 102 is provided at one end thereof with inclined protrusions 121. A rail 113 is mounted on the module housing 101 for guiding the slider 121 so that the slider 121 can be horizontally moved. When the slider 102 is horizontally moved while the module housing 101 is inserted in the cage 10, engaging the triangular protrusion 111 in the groove 11 as shown in FIG. 2, the inclined protrusions 121 are interposed between the case 10 and the module housing 101. As a result, the cage 10 and the module housing 101 are elastically deformed to some degree, which disengages the triangular protrusion 111 from the groove 11. At this time, it is required, however, that the slider 102 be continuously pushed to maintain the interposition of the inclined protrusions 121 between the case 10 and the module housing 101 until the module housing 101 is completely separated from the cage 10.

As described above, the conventional hot plugging device for optical transceiver modules has a problem in that the slider must be continuously pushed until the module housing is completely separated from the cage. The separating work between the module housing and the cage is very inconvenient. Furthermore, a space necessary to push the slider is required, which increases the space necessary to install the optical transceiver module. Consequently, the number of the optical transceiver modules mountable on the system is limited. In addition, the module housing or the cage may be permanently deformed or damaged when the slider is pushed to separate the module housing from the cage.

SUMMARY OF THE INVENTION

One object of the present invention is to provide a hot plugging device for optical transceiver modules, which is capable of easily engaging or disengaging the optical transceiver modules.

It is another object of the present invention to provide a hot plugging device for optical transceiver modules, which is capable of efficiently performing maintenance work even in a small working space.

One embodiment of the present invention is directed to a hot plugging device for an optical transceiver module including a module housing, latching grooves extended from prescribed positions of both sides of the module housing to one end of the module housing, respectively, sliding members extended in the longitudinal direction of the module housing and linearly movably accommodated in the latching grooves, respectively, and a rotating member rotatably attached to one end of the module housing for engaging ends of the sliding members with corresponding ends of the latching grooves, respectively, while the rotating member is placed at a prescribed angle to the longitudinal direction of the module housing.

Another embodiment of the present invention is directed to a hot plugging device for an optical transceiver module including a cage mounted on a host board of an optical transmitting/receiving system. The cage includes latches that extend from the inner sides thereof, respectively, and gradually spaced apart from the inner sides thereof in the longitudinal direction of the cage. The latches may be elastically deformed. The module also includes a module housing inserted into the cage in the longitudinal direction of the cage and having latching grooves formed at the outer sides thereof so that the latches of the cage are engaged in the ends of the latching grooves, respectively, and sliding members extended in the longitudinal direction of the module housing and linearly movably accommodated in the latching grooves, respectively. The module further includes a rotating member rotatably attached to one end of the module housing for pushing one end of each of the sliding members so that the other end of each of the sliding members is engaged with the end of the corresponding latching groove while the rotating member is placed at a prescribed angle to the module housing. The latches are disengaged from the corresponding latching grooves as the other end of each of the sliding members is engaged with the end of the corresponding latching groove.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, embodiments of the present invention will be described in detail with reference to the accompanying drawings. In the following, a detailed description of known functions and configurations incorporated herein will be omitted when it may obscure the subject matter of the present invention.

Figure 3:
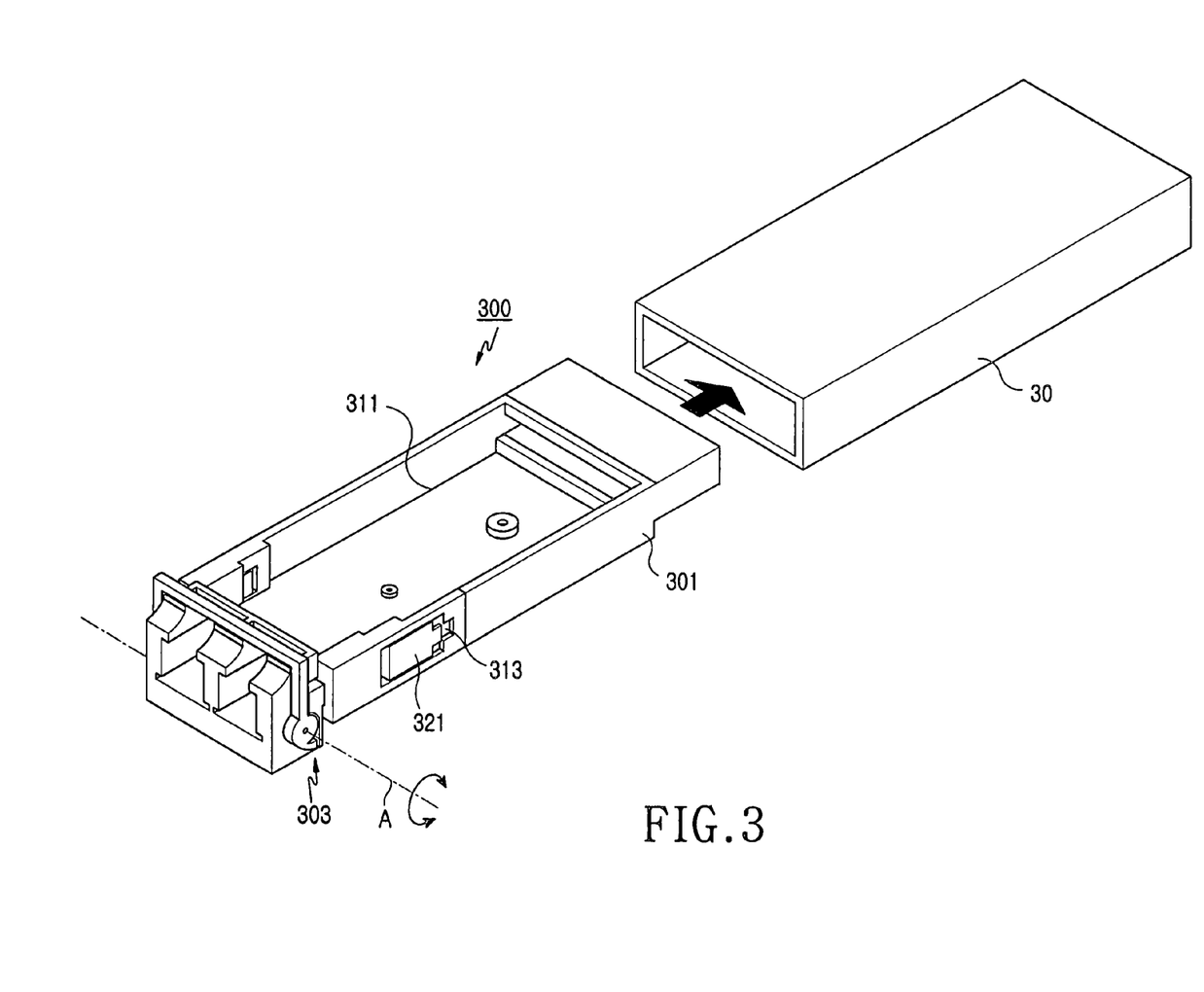
FIG. 3 is a perspective view showing a hot plugging device for optical transceiver modules according to an embodiment of the present invention.
Figure 4:
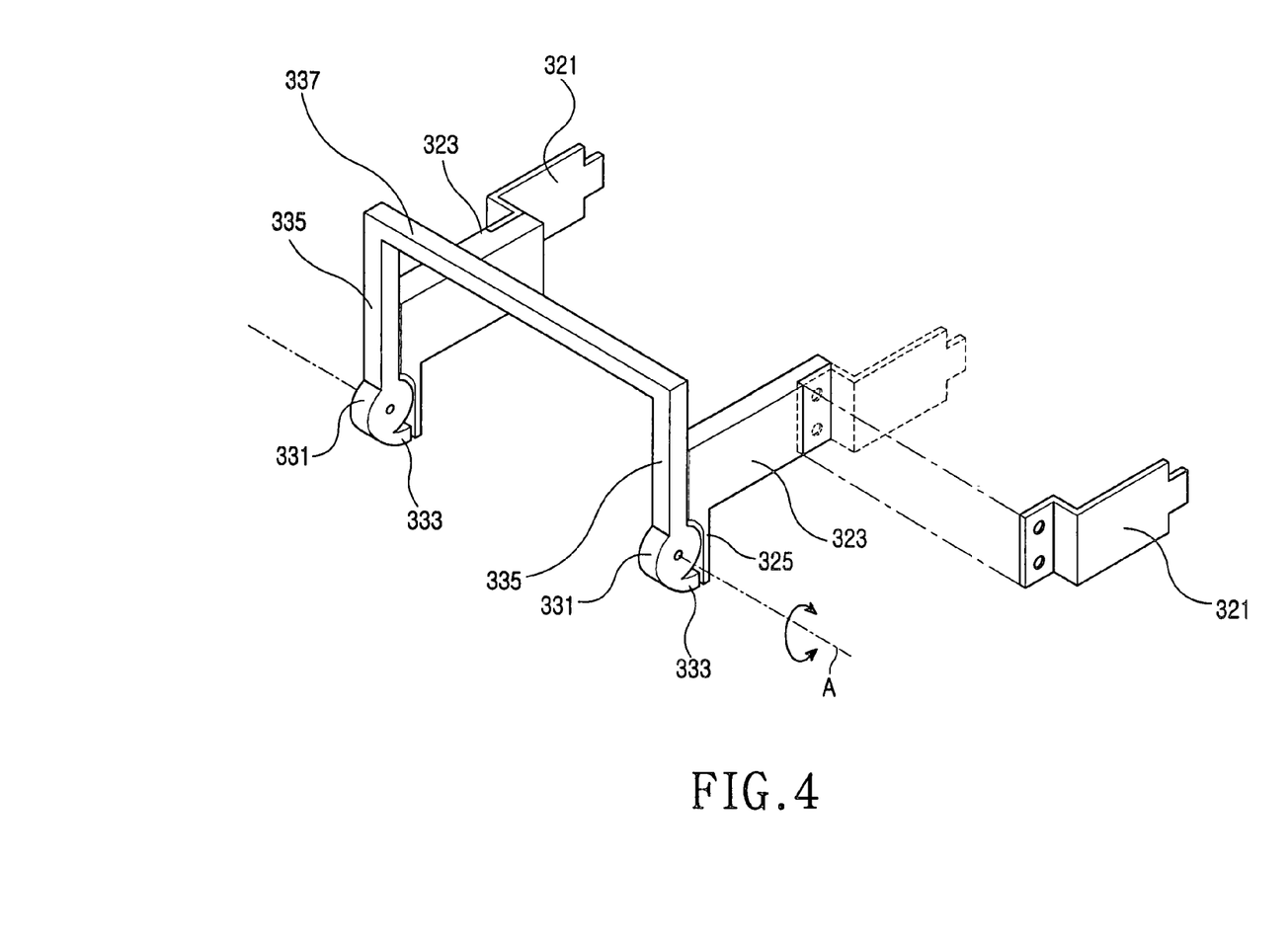
FIG. 4 is a perspective view showing a releasing unit of the hot plugging device shown in FIG. 3.

FIG. 3 is a perspective view showing a hot plugging device for optical transceiver modules according to one embodiment of the present invention. FIG. 4 is a perspective view showing a releasing unit of the hot plugging device shown in FIG. 3. As shown in FIGS. 3 and 4, the hot plugging device includes a module housing 301 having latching grooves 313 formed at both sides thereof, sliding members 321 and 323 linearly movably accommodated in the latching grooves 313, respectively, and a rotating member 303 rotatably attached to one end of the module housing 301. The module housing 301 is engaged in a cage 30, which may be mounted on a host board of an optical transmitting/receiving system (not shown).

Figure 5:
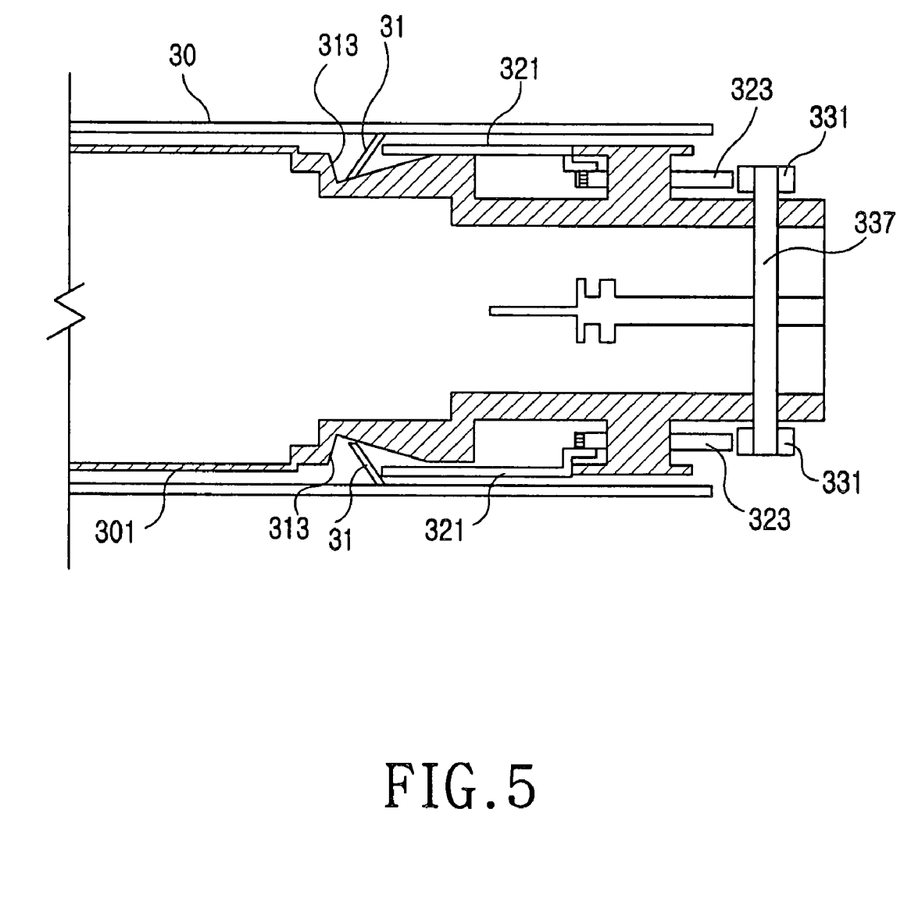
FIG. 5 is a plan view, in section, showing the hot plugging device of FIG. 3 engaged in a cage.

The module housing 301 is provide with an accommodating space 311, which is defined by a bottom surface of the module housing 301 and sidewalls upwardly extending from the edges of both sides of the bottom surface. The top part of the accommodating space 311 may be open. At the outer sides of the sidewalls of the module housing 301 are formed the latching grooves 313, respectively. The latching grooves 313 are formed so as to extend in the longitudinal direction of the module housing 301. One end of the module housing 301, i.e., the end of the module housing 301 inserted into the cage 30 is made up of a connector for connecting between circuit devices (not shown) accommodated in the module housing 301 and the optical transmitting/receiving system. When the module housing 301 is inserted into the cage 30, as shown in FIGS. 3 and 5, latches 31 (See FIG. 5) mounted in the cage 30 are engaged in the latching grooves 313 so that the module housing 301 is fixed in the cage 30. The latches 31 are longitudinally extended from the inner sides of the cage 30, respectively. The latches 31 are gradually spaced apart from the inner sides of the cage 30 in the longitudinal direction of the cage 30. The end of each of the latches 31 can be elastically deformed. When the module housing 301 is inserted into the cage 30, the latches 31 are elastically deformed to make close contact with the inner sides of the cage 30 until the latches 31 are engaged in the latching grooves 313 of the module housing 301. When the module housing 301 is inserted into the cage 30 to the extent that the latches 31 are adjacent to the latching grooves 313, the ends of the latches 31 are engaged in the latching grooves 30 by means of the elastic force of the latches 31 so that the module housing 301 is fixed in the cage 30.

The sliding members 321 and 323 and the rotating member 303 together form the afore-mentioned releasing unit for disengaging the module housing 301 from the cage 30.

The latches 31 must be disengaged from the latching grooves 313 to separate the module housing 301 from the cage 30. The sliding members 321 and 323 are linearly moved in the latching grooves 313 so that the latches 31 are disengaged from the latching grooves 313.

One end of each of the sliding members 321 and 323 is moved close to or away from one end of the module housing 301. As the sliding members 321 and 323 are linearly moved, the other end of each of the sliding members 321 and 323 approaches the end of the corresponding latching groove 313 or is engaged in the end of the corresponding latching groove 313. When the module housing 301 is inserted into the cage 30, and the latches 31 are adjacent to the latching grooves 313, the latches 31 push the ends of the sliding members 321 and 323 so that the latches 31 are engaged in the latching grooves 313 even though the ends of the sliding members 321 and 323 are engaged with the ends of the latching grooves 313, respectively. While the latches 31 are engaged in the latching grooves 313, the module housing 301 is separated from the cage 30 as follows: when the rotating member 303 is rotated, the sliding members 321 and 323 are engaged with the ends of the latching grooves 313 so that the latches 31 are disengaged from the latching grooves 313.

When the rotating member 303 is rotated to a prescribed angle, the sliding members 321 and 323 are engaged with the ends of the latching grooves 313 so that the module housing 301 can be separated from the cage 30. For example, if the rotating member 303 located vertically in the longitudinal direction of the module housing 301 is rotated to 90 degree, the module housing 301 is disengaged from the cage 30.

As shown in FIG. 4, the sliding members 321 and 323 comprise operating members 321 and corresponding actuating members 323. The operating members 321 are attached to the ends of the corresponding actuating members 323, respectively. The operating members 321 are linearly moved on the outer sides of the module housing 301, and engaged with the ends of the latching grooves 313 so that the latches 31 are disengaged from the corresponding latching grooves 313. The actuating members 323 are linearly moved in both sidewalls of the module housing 301. One end of each of the actuating members 323 is moved close to or a way from one end of the module housing 301. At the other end of each of the actuating members 323 is integrally formed an actuating piece 325, which is extended in one direction. When the rotating member 303 is rotated, the actuating pieces 325 of the actuating members 323 push the actuating members 323 and the operating members 321 so that the actuating members 323 and the operating members 321 are linearly moved. Since the actuating members 323 and the operating members 321 are individually provided, each of the latching grooves 313 also comprises an engaging groove and an actuating groove. In the engaging grooves are engaged the operating members 321 or the latches 31, respectively. The actuating members 323 are linearly moved in the actuating grooves, respectively.

The actuating members 323 are linearly moved in the sidewalls of the module housing 301. The linear movement of the sliding members 321 is stably performed. On the other hand, the operating members 321 are linearly moved in the latching grooves 313 while they are exposed at the outer sides of the module housing 301 since the latches 31 are to be disengaged from the latching grooves 313 by means of the operating members 321.

The operating members 321 are integrally formed with the corresponding actuating members 323. Although the operating members 321 and the actuating members 323 may be separately manufactured and then assembled with each other since the actuating members 323 are placed in the sidewalls of the module housing 301 and the operating members 321 are exposed at the outer sides of the module housing 301.

The rotating member 303 comprises two rotating bodies 331, two linking parts 335, and a holding part 337.

The rotating bodies 331 are rotatably attached to both sides of the module housing 301, respectively, in such a manner that the rotating bodies 331 are close to the outer ends of the sliding members 321 and 323. When the rotating member 303 is rotated, the sliding members 321 and 323 are pushed by means of the rotating bodies 331. Each of the rotating bodies 331 has a push arm 333 outwardly protruded from the circumference thereof. When the rotating member 303 is rotated, the push arms 333 directly push the sliding members 321 and 323, more specifically the actuating pieces 325 of the actuating members 323. The linking parts 335 are extended from the rotating bodies 331, respectively, in such a manner that they are opposite to each other in one direction. The ends of the linking parts 335 are connected to each other by means of the holding part 337.

Referring to FIGS. 3 and 5, it can be seen that the sliding members 321 and 323 may be separated from the ends of the corresponding latching grooves 313 when the linking parts 335 are placed perpendicularly to the longitudinal direction of the module housing 301. Also, the sliding members 321 and 323 may be engaged with the ends of the corresponding latching grooves 313, as described above. In this case, the latches 31 may be engaged in the corresponding latching grooves 313 while pushing the sliding members 321 and 323 when the module housing 301 is inserted into the cage 30.

Figure 6:
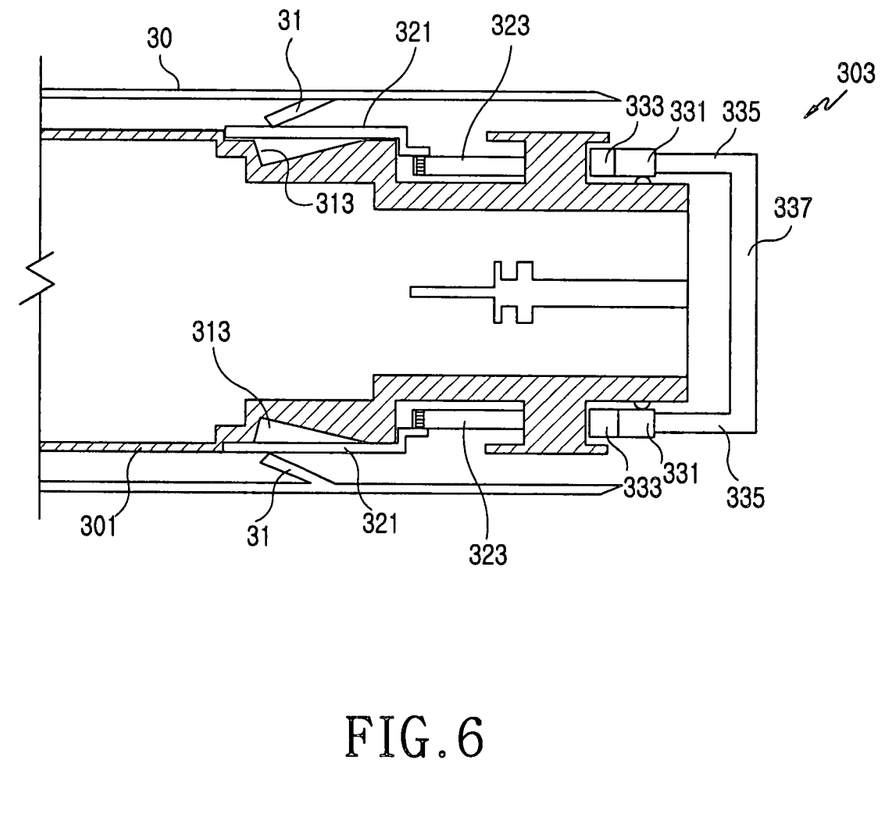
FIG. 6 is a plan view, in section, showing the hot plugging device of FIG. 3 disengaged from the cage.

The separation of the module housing 301 from the cage 30 will now be described with reference to FIGS. 3 and 6. When the linking parts 335 are rotated so that they are extended in the longitudinal direction of the module housing 301, the push arms 333 of the rotating bodies 331 push the actuating members 323, specifically the actuating pieces 325 of the actuating members 323. As a result, the ends of the operating members 321 are engaged with the latching grooves 313 so that the latches 31 are disengaged from the corresponding latching grooves 313, respectively. At this time, the holding part 337 of the rotating member 303 is placed at the end of the module housing 301. Consequently, the holding part 337 can be pulled so that the module housing 301 is easily separated from the cage 30.

In the conventional art, it is required that the module housing be pulled while the slider is pushed to separate the module housing from the cage. According to aspects of the present invention, the latches 31 are disengaged from the corresponding latching grooves by simply rotating the rotating member 303. Consequently, the module housing 301 is easily separated from the cage 30 by simply rotating and pulling the rotating member 303.

As apparent from the above description, embodiments of the present invention provide a hot plugging device that is capable of easily releasing a locking unit of a module housing and maintaining the release of the locking unit by using a rotating member and sliding members. This allows the module housing to be easily separated from a cage. Also, the working space necessary to separate the module housing from the cage is reduced as compared to conventional modules. This also allows more optical transceiver modules to be mounted on the same space. Furthermore, only latching pieces are deformed when the module housing is separated from the cage as compared to conventional hot plugging devices in which both of the module housing and the cage are elastically deformed due to a slider. Consequently, embodiments of the present invention prevent permanent deformation of the module housing or the cage or damage to the module housing or the cage.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A hot plugging device for an optical transceiver module, comprising:
   a module housing for insertion into a structure that surrounds said module housing and has a latch;
   at least one latching groove extended from a prescribed position on a side of the module housing toward one end of the module housing, wherein the latch is engaged with the latching groove;
   at least one sliding member extended in a longitudinal direction of the module housing and linearly movably accommodated in the latching groove; and
   a rotating member rotatably attached to one end of the module housing for engaging an end of the sliding member with a corresponding end of the latching groove, the rotation into engagement being operable to urge said latch out of engagement with the latching groove.

2. The device as set forth in claim 1, wherein said at least one latching groove comprises latching grooves extending from prescribed positions on both sides of the module housing toward said one end of the module housing, and wherein said at least one sliding member comprises sliding members extended in said longitudinal direction of the module housing and linearly movably accommodated in the latching grooves, respectively.

3. The device as set forth in claim 2, wherein the module housing has a bottom surface, and sidewalls upwardly extending from respective edges of both sides of the bottom surface, and wherein each of the latching grooves comprises:
   an engaging groove, of a prescribed length, depressed to a prescribed depth on the sidewalls of the module housing; and
   an actuating groove extended from the end of the engaging groove toward one end of the module housing.

4. The device as set forth in claim 2, wherein each of the sliding members has one end moving close to or away from one end of the module housing, and the other end approaching the end of the corresponding latching groove or engaged in the end of the corresponding latching groove as the sliding members are linearly moved.

5. The device as set forth in claim 2, wherein the rotating member comprises:
   rotating bodies rotatably attached to said both sides of the module housing, respectively, for pushing the sliding members, the rotating bodies being close to the outer ends of the sliding members;
   linking parts extended from the rotating bodies, respectively, said linking parts being opposite to each other and disposed commonly in one direction; and
   a holding part for connecting the ends of linking parts to each other.

6. The device as set forth in claim 5, wherein each of the rotating bodies has a push arm for pushing one end of each of the sliding members at a prescribed angle so that the other end of each of the sliding members is engaged with the corresponding latching groove.

7. The device as set forth in claim 5, wherein the rotating bodies push the sliding members so that the other end of each of the sliding members is engaged with the corresponding latching groove when the linking parts are placed in parallel with said longitudinal direction of the module housing.

8. The device as set forth in claim 1, wherein the rotating member engages said end of the sliding member with said corresponding end of the latching groove as a result of the rotating member being placed at a prescribed angle to said longitudinal direction of the module housing.

9. The device of claim 1, configured such that a sliding member of said at least one sliding member performs the urging out of engagement by pushing toward the an end of the module housing opposite to said one end.

10. A hot plugging device for an optical transceiver module, comprising:
  a cage mountable on a host board, the cage having latches extended from the inner sides thereof, respectively, and gradually spaced apart from the inner sides thereof in the longitudinal direction of the cage, the latches being elastically deformed;
  a module housing inserted into the cage in the longitudinal direction of the cage and having latching grooves formed at the outer sides thereof so that the latches of the cage are engaged in the ends of the latching grooves, respectively;
  sliding members extended in the longitudinal direction of the module housing and linearly movably accommodated in the latching grooves, respectively; and
  a rotating member rotatably attached to one end of the module housing for pushing one end of each of the sliding members so that the other end of each of the sliding members is engaged with the end of the corresponding latching groove while the rotating member is placed at a prescribed angle to the module housing, wherein
  the latches are disengaged from the corresponding latching grooves as the other end of each of the sliding members is engaged with the end of the corresponding latching groove.

11. The device as set forth in claim 10, wherein the latches are symmetrically formed at said inner sides of the cage, said inner sides being mutually opposite.

12. The device as set forth in claim 10, wherein the rotating member comprises:
  rotating bodies rotatably attached to both sides of the module housing, respectively, for pushing the sliding members, the rotating bodies being located at the outer ends of the respective sliding members;
  linking parts extended from the rotating bodies, respectively, said linking parts being opposite to each other and disposed in one direction; and
  a holding part for connecting ends of the linking parts to each other.

13. The device as set forth in claim 12, wherein each of the rotating bodies has a push arm for pushing one end of each of the sliding members at a prescribed angle so that the other end of each of the sliding members is engaged with the corresponding latching groove.

14. The device as set forth in claim 12, wherein the rotating bodies push the sliding members so that the other end of each of the sliding members is engaged with the corresponding latching groove when the linking parts are placed in parallel with said longitudinal direction of the module housing.

15. The device of claim 10, configured such that said pushing pushes said each of the sliding members toward the an end of the module housing opposite to said one end.

16. The device of claim 10, configured such that said pushing transitions said module housing from a state of engagement by said latches into a state of disengagement from said latches.

* * * * *